US010405235B2

(12) United States Patent
Cherian et al.

(10) Patent No.: US 10,405,235 B2
(45) Date of Patent: Sep. 3, 2019

(54) SYSTEMS AND METHODS FOR TRAFFIC DETECTION NETWORK CONTROL

(71) Applicant: QUALCOMM Incorporated, San Diego, CA (US)

(72) Inventors: George Cherian, San Diego, CA (US); Jun Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 365 days.

(21) Appl. No.: 13/625,414

(22) Filed: Sep. 24, 2012

(65) Prior Publication Data

US 2013/0077491 A1 Mar. 28, 2013

Related U.S. Application Data

(60) Provisional application No. 61/539,348, filed on Sep. 26, 2011.

(51) Int. Cl.
G01R 31/08 (2006.01)
H04W 28/10 (2009.01)
(Continued)

(52) U.S. Cl.
CPC ............ H04W 28/10 (2013.01); H04L 69/22 (2013.01); H04L 69/32 (2013.01); H04L 67/322 (2013.01)

(58) Field of Classification Search
CPC .. H04W 28/08; H04W 28/0289; H04L 47/10; H04L 47/12; H04L 47/2441
(Continued)

(56) References Cited

U.S. PATENT DOCUMENTS

2001/0052012 A1 12/2001 Rinne et al.
2002/0019228 A1* 2/2002 McKenna ............... H04W 8/26
455/435.1
(Continued)

FOREIGN PATENT DOCUMENTS

CN 101179335 A 5/2008
CN 102017689 A 4/2011
(Continued)

OTHER PUBLICATIONS

International Search Report and Written Opinion—PCT/US2012/057326—ISA/EPO—Jan. 28, 2013.

Primary Examiner — Atique Ahmed
(74) Attorney, Agent, or Firm — Arent Fox, LLP

(57) ABSTRACT

Systems and methods for communicating in a wireless communication system are described. One implementation is provided for controlling aspects of a wireless communication system network via a traffic detection function at the user equipment. The method includes obtaining, at an electronic device, an application configuration, the application configuration including an application identifier identifying an application of a plurality of applications and a network communication characteristic corresponding to each of the plurality of applications. The method further includes detecting, at the electronic device, the application identifier in a packet of network traffic. The method also includes transmitting, from the electronic device, the packet of network traffic based on the network communication characteristic corresponding to the detected application identifier. By providing an application identifier, fine grained (e.g., application specific) network controls may be implemented such as quality of service, charging/accounting, idle handoff, and traffic redirection/load balancing.

78 Claims, 8 Drawing Sheets

(51) Int. Cl.
*H04L 29/06* (2006.01)
*H04L 29/08* (2006.01)

(58) Field of Classification Search
USPC .............. 370/235, 468, 412, 229; 709/229; 707/104.1
See application file for complete search history.

(56) References Cited

U.S. PATENT DOCUMENTS

| | | | | |
|---|---|---|---|---|
| 2002/0181395 | A1* | 12/2002 | Foster | H04L 49/357 370/229 |
| 2003/0064724 | A1* | 4/2003 | Park | H04W 36/0066 455/436 |
| 2003/0134622 | A1* | 7/2003 | Hsu | H04W 76/40 455/414.1 |
| 2004/0156378 | A1* | 8/2004 | Walls | H04L 29/06 370/412 |
| 2005/0266851 | A1* | 12/2005 | Kouno | H04W 36/12 455/436 |
| 2006/0128392 | A1* | 6/2006 | Turina | H04W 48/06 455/452.1 |
| 2006/0209827 | A1* | 9/2006 | Calvignac | H04L 49/90 370/392 |
| 2006/0215609 | A1* | 9/2006 | Kyung et al. | 370/331 |
| 2006/0233101 | A1* | 10/2006 | Luft | H04L 41/0896 370/229 |
| 2008/0126420 | A1* | 5/2008 | Wright | H04N 21/845 |
| 2008/0267203 | A1 | 10/2008 | Curcio et al. | |
| 2008/0298391 | A1* | 12/2008 | Feroz | H04L 47/10 370/468 |
| 2009/0285225 | A1 | 11/2009 | Dahod | |
| 2009/0304015 | A1* | 12/2009 | Willars | H04L 47/803 370/412 |
| 2010/0105389 | A1* | 4/2010 | Chin | H04W 36/08 455/436 |
| 2011/0219426 | A1 | 9/2011 | Kim et al. | |
| 2011/0263256 | A1* | 10/2011 | Yavuz | H04W 36/0085 455/436 |
| 2011/0320620 | A1* | 12/2011 | Cutler et al. | 709/229 |
| 2012/0087262 | A1 | 4/2012 | Rasanen et al. | |
| 2012/0099592 | A1 | 4/2012 | Ludwig | |
| 2012/0144049 | A1 | 6/2012 | Lopez Nieto et al. | |
| 2012/0173729 | A1* | 7/2012 | Lee | G06F 9/5044 709/226 |
| 2012/0324100 | A1* | 12/2012 | Tomici | H04L 45/123 709/224 |

FOREIGN PATENT DOCUMENTS

| | | |
|---|---|---|
| CN | 102067548 A | 5/2011 |
| JP | 2002094568 A | 3/2002 |
| JP | 2004080707 A | 3/2004 |
| JP | 2007282142 A | 10/2007 |
| WO | 2009135309 A1 | 11/2009 |

* cited by examiner

SYSTEMS AND METHODS FOR TRAFFIC DETECTION NETWORK CONTROL

CLAIM OF PRIORITY

The present Application claims priority to Provisional Application No. 61/539,348, entitled "SYSTEMS AND METHODS FOR TRAFFIC DETECTION NETWORK CONTROL," filed Sep. 26, 2011, of which is assigned the assignee hereof and hereby expressly incorporated by reference herein.

BACKGROUND

Field

The present application relates generally to wireless communication systems and more specifically to systems, methods, and devices for controlling aspects of a wireless communication system network via the traffic detection function.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, $3^{rd}$ Generation Partnership Project (3GPP) Long Term Evolution (LTE) systems, and orthogonal frequency division multiple access (OFDMA) systems.

In some implementations, it may be desirable to alter the function of the communication system. One way to control the network is through the traffic detection function (TDF). The TDF may be a functional entity that permits or denies network traffic. The traffic may be permitted or denied based on coarse grained attributes such as bandwidth for the detected application traffic or the application generating the network traffic. In either case, detecting the application is performed on a best effort basis based on source or destination IP, source or destination port, or protocol. As networked based services from the same destination IP begin to offer various content types with varying bandwidth requirements (e.g., Skype video, text, and chat), improved methods and systems for network control are desirable.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include controlling aspects of a wireless communication system network via the traffic detection function.

In one innovative aspect, a method of controlling network traffic is provided. The method includes obtaining, at an electronic device, an application configuration, the application configuration including an application identifier identifying an application of a plurality of applications and a network communication characteristic corresponding to each of the plurality of applications, each of the plurality of applications configured to access a common network destination using a common network protocol from a device. The method further includes detecting, at the electronic device, the application identifier in a packet of network traffic. The method also includes transmitting, from the electronic device, the packet of network traffic based on the network communication characteristic corresponding to the detected application identifier.

In a further innovative aspect, a device for controlling network traffic is provided. The device includes a rules receiver configured to obtain, at the device, an application configuration, the application configuration including an application identifier identifying an application of a plurality of applications and a network communication characteristic corresponding to each of the plurality of applications, each of the plurality of applications configured to access a common network destination using a common network protocol from a device. The device also includes a traffic detector configured to detect, at the device, the application identifier in a packet of network traffic. The device further includes a transmitter configured to transmit, from the device, the packet of network traffic based on the network communication characteristic corresponding to the detected application identifier.

In yet another innovative aspect, a further device for controlling network traffic is provided. The device includes means for obtaining, at the device, an application configuration, the application configuration including an application identifier identifying an application of a plurality of applications and a network communication characteristic corresponding to each of the plurality of applications, each of the plurality of applications configured to access a common network destination using a common network protocol from a device. The device also includes means for detecting, at the device, the application identifier in a packet of network traffic. The device further includes means for transmitting, from the device, the packet of network traffic based on the network communication characteristic corresponding to the detected application identifier.

In another innovative aspect, a computer-readable storage medium comprising instructions executable by a processor of an apparatus is provided. The instructions cause the apparatus to obtain, at the apparatus, an application configuration, the application configuration including an application identifier identifying an application of a plurality of applications and a network communication characteristic corresponding to each of the plurality of applications, each of the plurality of applications configured to access a common network destination using a common network protocol from a device. The instructions also cause the apparatus to detect, at the apparatus, the application identifier in a packet of network traffic. The instructions additionally cause the apparatus to transmit, from the apparatus, the packet of network traffic based on the network communication characteristic corresponding to the detected application identifier.

A method of controlling network traffic is provided in a further innovative aspect. The method includes generating, at a network entity, an application configuration, the application configuration including an application identifier identifying an application of a plurality of applications and a network communication characteristic corresponding to each of the plurality of applications, each of the plurality of applications configured to access a common network destination using a common network protocol from a device. The method includes transmitting, from the network entity to an electronic device, the application configuration.

A further device for controlling network traffic is provided in another innovative aspect. The device includes a configuration generator configured to generate an application configuration, the application configuration including an application identifier identifying an application of a plurality of applications and a network communication characteristic corresponding to each of the plurality of applications, each of the plurality of applications configured to access a common network destination using a common network protocol from a device. The device also includes a transmitter configured to transmit, to an electronic device, the application configuration.

Yet another device for controlling network traffic is provided in a further innovative aspect. The device includes means for generating, at an network entity, an application configuration, the application configuration including an application identifier identifying an application of a plurality of applications and a network communication characteristic corresponding to each of the plurality of applications, each of the plurality of applications configured to access a common network destination using a common network protocol from a device. The device further includes means for transmitting, from the network entity to an electronic device, the application configuration.

In another innovative aspect, computer-readable storage medium comprising instructions executable by a processor of an apparatus is provided. The instructions cause the apparatus to generate an application configuration, the application configuration including an application identifier identifying an application of a plurality of applications and a network communication characteristic corresponding to each of the plurality of applications, each of the plurality of applications configured to access a common network destination using a common network protocol from a device. The instructions also cause the apparatus to transmit, to an electronic device, the application configuration.

BRIEF DESCRIPTION OF THE DRAWINGS

FIG. 6 shows a flow diagram for an exemplary method of controlling application traffic.

DETAILED DESCRIPTION

Figure 1:
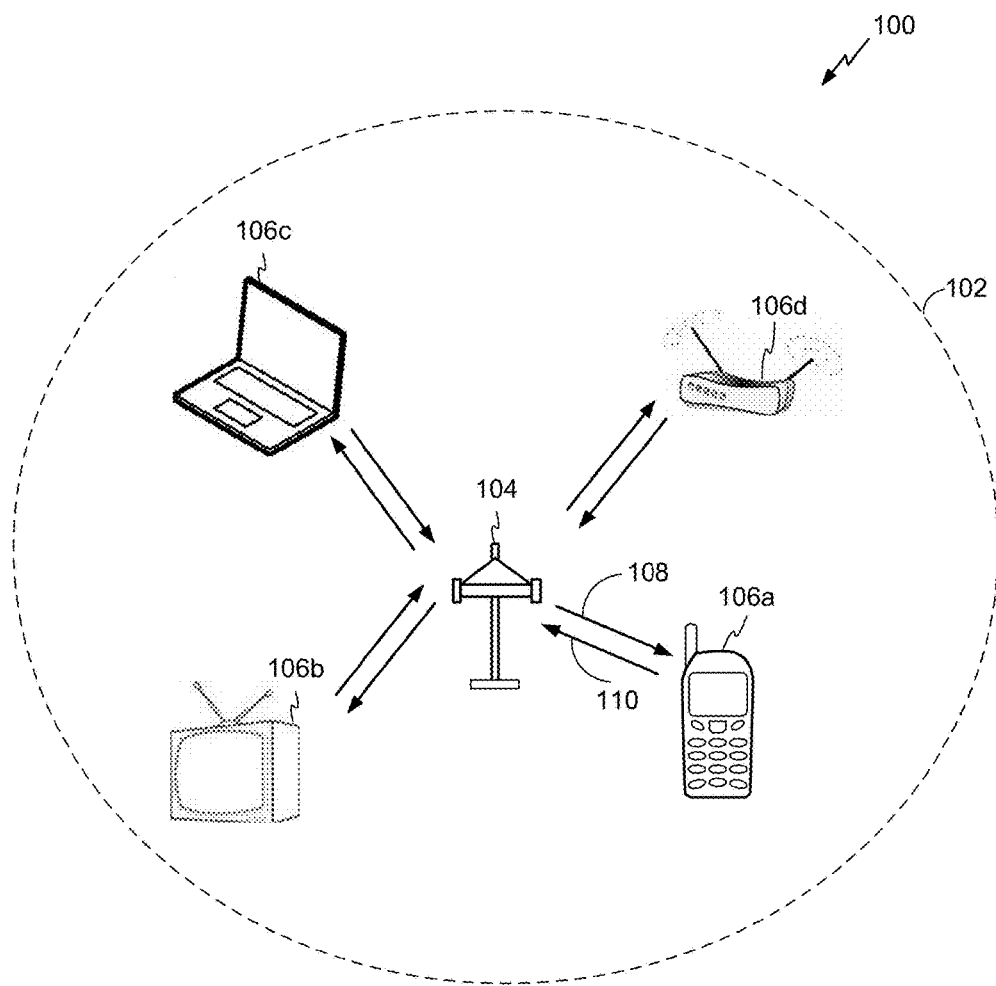
FIG. 1 shows a functional block diagram of an exemplary wireless communication system.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

In some aspects, wireless signals in a sub-gigahertz band may be transmitted using orthogonal frequency-division multiplexing (OFDM), direct-sequence spread spectrum (DSSS) communications, a combination of OFDM and DSSS communications, or other schemes.

In some implementations, a wireless network includes various devices which are the components that access the wireless network. For example, there may be two types of devices: access points ("APs") and clients (also referred to as stations, or "STAs"). In general, an AP serves as a hub or base station for the wireless network and an STA serves as a user of the wireless network. For example, an STA may be a laptop computer, a personal digital assistant (PDA), a mobile phone, etc. In an example, an STA connects to an AP via an enhanced high rate packet data or long term evolution wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or be known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium such as eHRPD or LTE.

FIG. 1 shows a functional block diagram of an exemplary wireless communication system. The wireless communication system 100 may operate pursuant to a wireless standard, for example eHRPD or LTE. The wireless communication system 100 may include an AP 104, which communicates with STAs such as a mobile phone 106a, a television 106b, a computer 106c, or another access point 106d (individually or collectively hereinafter identified by 106).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide wireless communication coverage in a basic service area (BSA) 102. The AP 104 along with the STAs 106 associated with the AP 104 and that are configured to use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
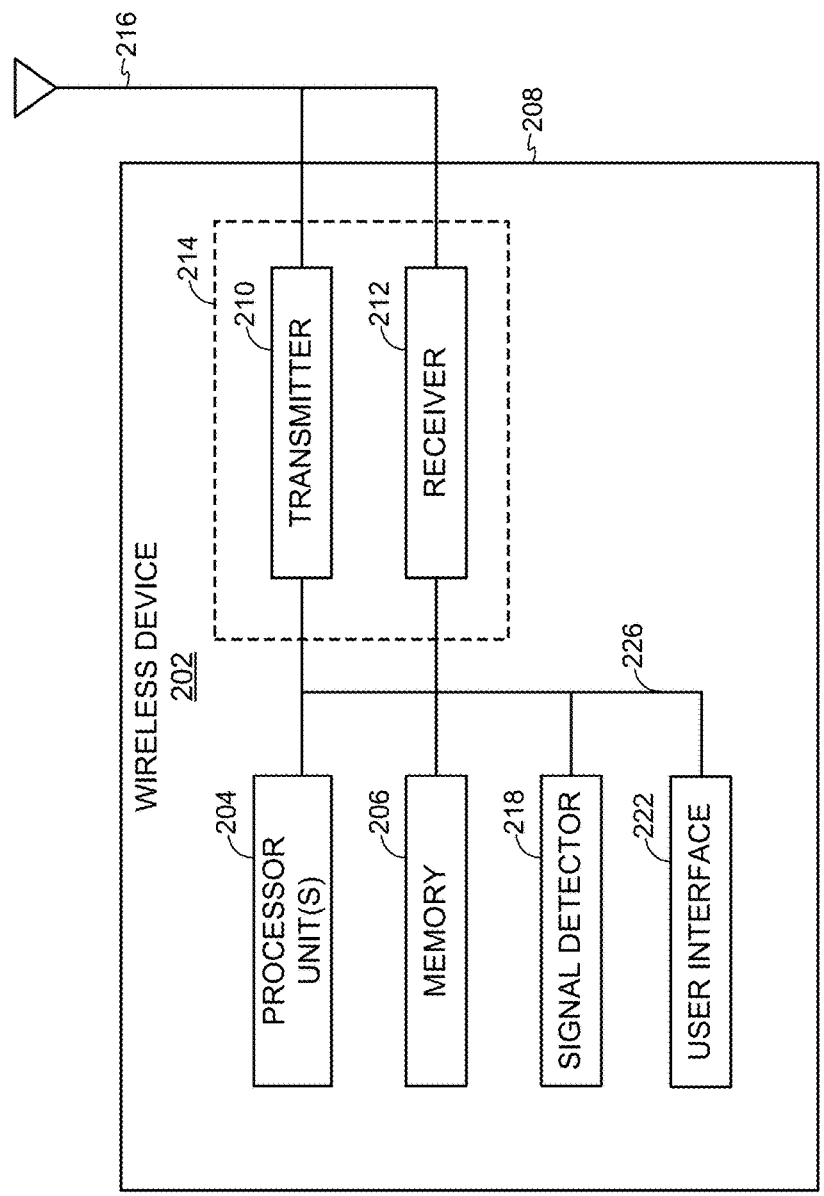
FIG. 2 shows a functional block diagram of an exemplary wireless device that may be employed within the wireless communication system of FIG. 1.

FIG. 2 shows a functional block diagram of an exemplary a wireless device that may be employed within the wireless communication system of FIG. 1. The wireless device 202 is an example of a device that may be configured to implement the various methods described herein. For example, the wireless device 202 may comprise the AP 104 or one of the STAs 106.

The wireless device 202 may include processor unit(s) 204 which control operation of the wireless device 202. One or more of the processor unit(s) 204 may be collectively referred to as a central processing unit (CPU). Memory 206, which may include both read-only memory (ROM) and random access memory (RAM), provides instructions and data to the processor units 204. A portion of the memory 206 may also include non-volatile random access memory (NVRAM). The memory 206 may include other non-volatile storage medium which may be computer-readable. The processor unit(s) 204 may be configured to perform logical and arithmetic operations based on program instructions stored within the memory 206. Other examples of processor unit(s) 204 will be described below with reference to FIGS. 3 and 4. The instructions in the memory 206 may be executable to implement the methods described herein.

The processor unit(s) 204 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor unit(s) 204 comprise a DSP, the DSP may be configured to generate a packet for transmission. In some aspects, the packet may comprise a physical layer data unit (PPDU).

The wireless device 202 may also include machine-readable media for storing software. In addition or as an alternative to the memory 206, the processor unit(s) 204 may comprise one or more machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor unit(s) 204, cause the wireless device 202 to perform the various functions described herein.

The wireless device 202 may include a transmitter 210 and/or a receiver 212 to allow transmission and reception, respectively, of data between the wireless device 202 and a remote location. The transmitter 210 and receiver 212 may be combined into a transceiver 214. An antenna 216 may be attached to the housing 208 and electrically coupled with the transceiver 214. The wireless device 202 may also include (not shown) multiple transmitters, multiple receivers, multiple transceivers, and/or multiple antennas.

The transmitter 210 may be configured to wirelessly transmit packets and/or signals. For example, the transmitter 210 may be configured to transmit different types of packets generated by the processor unit(s) 204, discussed above. The packets are made available to the transmitter 201. For example, the processor unit(s) 204 may store a packet in the memory 206 and the transmitter 201 may be configured to retrieve the packet. Once the transmitter retrieves the packet, the transmitter 201 transmits the packet to a STA 106 wireless device 202 via the antenna 216.

An antenna 216 on a STA 106 wireless device 202 detects the transmitted packets/signals. The STA 106 receiver 212 may be configured to process the detected packets/signals and make them available to the processor unit(s) 204. For example, the STA 106 receiver 212 may store the packet in memory 206 and the processor unit(s) 204 may be configured to retrieve the packet.

The wireless device 202 may also include a signal detector 218 that may be used to detect and quantify the level of signals received by the transceiver 214. The signal detector 218 may detect such signals as total energy, energy per subcarrier per symbol, power spectral density, and other signals.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user. The wireless device 202 may also include a housing 208 surrounding one or more of the components included in the wireless device 202.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism (e.g., wireless transmission and/or optical coupling).

Although a number of separate components are illustrated in FIG. 2, those of skill in the art will recognize that one or more of the components may be combined or commonly implemented. For example, the processor unit(s) 204 may be used to implement not only the functionality described above with respect to the processor unit(s) 204, but also to implement the functionality described above with respect to the signal detector 218. Further, each of the components illustrated in FIG. 2 may be implemented using a plurality of separate elements.

Figure 3:
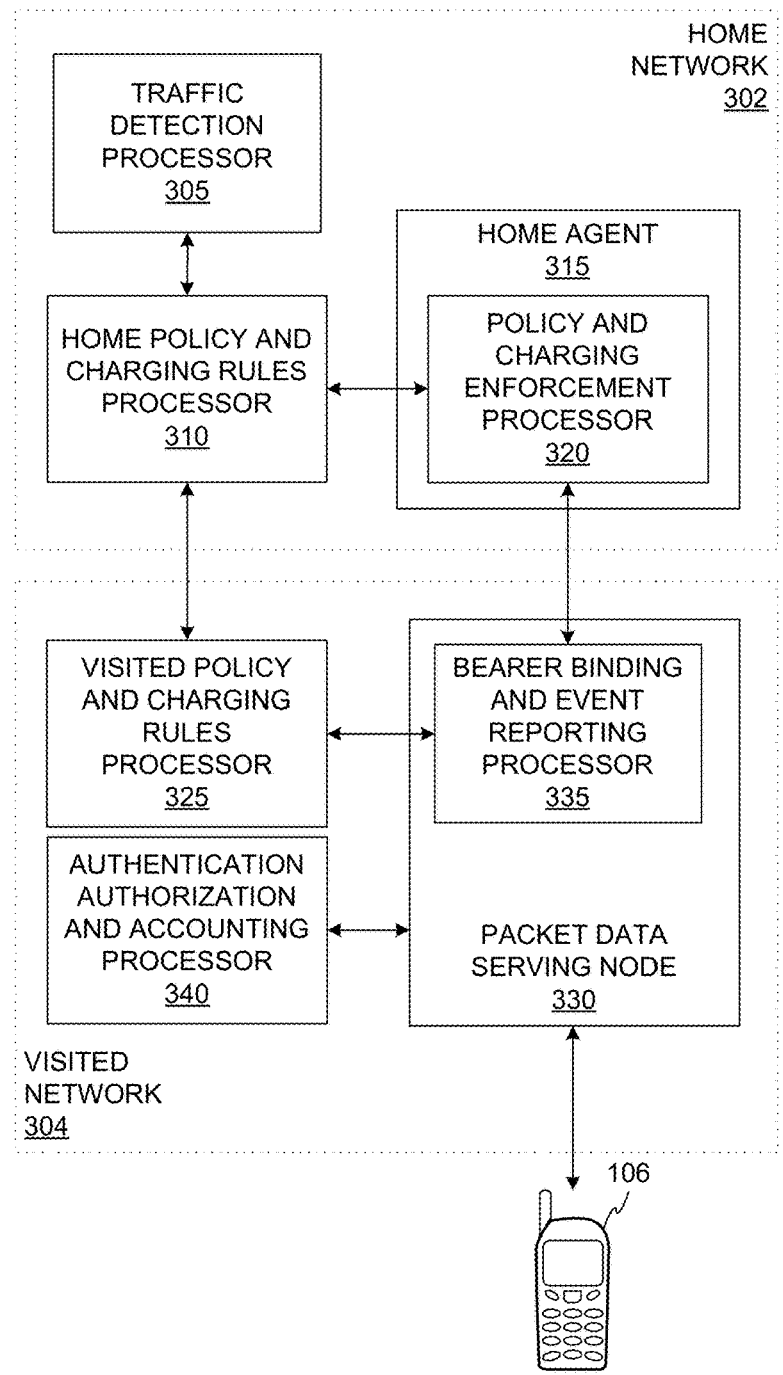
FIG. 3 shows a functional block diagram of an exemplary wireless communication system including traffic detection.

FIG. 3 shows a functional block diagram of an exemplary wireless communication system including traffic detection. The system shown includes two networks, a home network 302 and a visited network 304. If the user equipment 106 connects with a network it has already registered with, it may be said to be connecting to its home network 302. When the user equipment 106 connects to a network which is has not been connected to, it may be said that the user question is connecting to a visited network 304.

The home network 302 includes a traffic detection processor 305 configured to perform the traffic detection function. The traffic detection processor 305 is a functional entity that may be configured to perform application detection. The application detection may be performed by performing deep packet inspection on the packets that are transferred through the traffic detection processor 305. For example, content-type (mime type) of the HTTP header may be used for application detection. A unique identifier is used to map each of the application type, and the mapping of application type to the application identifier is commonly shared with home policy and charging rules processor 310, visited policy and charging rules processor 325 and a bearer binding and event reporting processor 335. The sharing of mapping information may be achieved by a signaling from traffic detection processor 305 to each of the elements identified above, or by means of pre-configuration. The traffic detection processor 305 may be configured to report detected applications to other components of the system such as an authorization, authentication, and accounting processor 340. The traffic detection processor 305 may be configured to provide a service data flow description to a policy charging and rules processor configured to perform the policy and charging rules function. Accordingly, the traffic detection processor 305 is configured to apply an identification rule to extract an application identifier and map the application identifier to policy and charging rules, authentication authorization and accounting rules, bearer binding and event reporting rules, and the like.

The home network 302 may include a home policy and charging rules processor 310. The home policy and charging rules processor 310 may be configured to apply quality of service and charging (e.g., accounting) functions for the home network 302. In the system shown, the traffic detection processor 305 may be coupled with the home policy and charging rules processor 310. The home policy and charging rules processor 310 may be coupled with a home agent 315. The home agent 315 is used to allow the user equipment 106 to access the home network 302 via the visited network 304.

The home agent 315 may include a policy and charging enforcement processor 320. The policy and charging enforcement processor 320 may be configured to perform the policy and charging enforcement function (PCEF). The PCEF may include applying the various rules identified by the policy and charging rules processor 310 to the network traffic. In one implementation, the policy and charging enforcement processor 320 applies the rules using common management information protocol (CMIP) and/or proxy mobile IP (PMIP).

As discussed above, the user equipment 106 may attach to a visited network 304. It may be desirable in certain implementations to allow the visited network 304 to operate under the same policy conditions as the home network 302. In this circumstance, the home policy and charging rules processor 310 may be coupled with a visited policy and charging rules processor 325. Policy and charging rules may be exchanged between the home policy and charging rules processor 310 and visited policy and charging rules processor 325. In some implementations, the rules may be transmitted from the home policy and charging rules processor 310 to the visited policy and charging rules processor 325. The visited policy and charging rules processor 325 may be similarly configured as the home policy and charging rules processor 310 described above.

The visited policy and charging rules processor 325 may be coupled with a packet data serving node 330. The packet data serving node 330 may be configured to bridge radio access network and an IP network. For example, the packet data service node 330 may be implemented in a cdma2000 network or may be implemented as a gateway general packet radio service node (e.g., a support node) in a UMTS network. The packet data serving node 330 may comprise a mobile access gateway. The mobile access gateway may be configured to manage communications for the user equipment 106 connected via a particular radio access technology to a packet data serving node 330. When the user equipment 106 connects to a visited network, the connection may be via the mobile access gateway.

In some implementations, the packet data service node 300 may include a bearer binding and event reporting processor 335. The binding and event reporting processor 335 may be configured to perform the bearer binding and event reporting function (BBREF). The bearer binding and event reporting function may include providing an interface between a service data flow of the visited network 304 and the home network 302.

The implementation shown in FIG. 3 is one configuration which provides downlink traffic detection and management. Uplink management may be performed by the user equipment 106 based on rules provided by the network to the user equipment 106. By such a configuration, packet data may be selectively authenticated, routed, and accounted.

In some implementations, it may be desirable for the network operator to provide some or all of the rules to the user equipment 106 for enforcement by the user equipment 106. The home network 302 may provision the rules to the user equipment 106, for example, over the air transmission. The home network 302 may later provide periodic updates to the traffic rules. Similarly, as the user equipment 106 roams through the network or onto other operator's networks, the visited network 304 may provide local traffic rules to the user equipment 106. For example, in the association request transmitted by the user equipment 106 to access the visited network 304, a capability identifier may be transmitted indicating the user equipment 106 is capable of performing traffic detection. The visited network 304 may respond with one or more local traffic detection rules.

Figure 4:
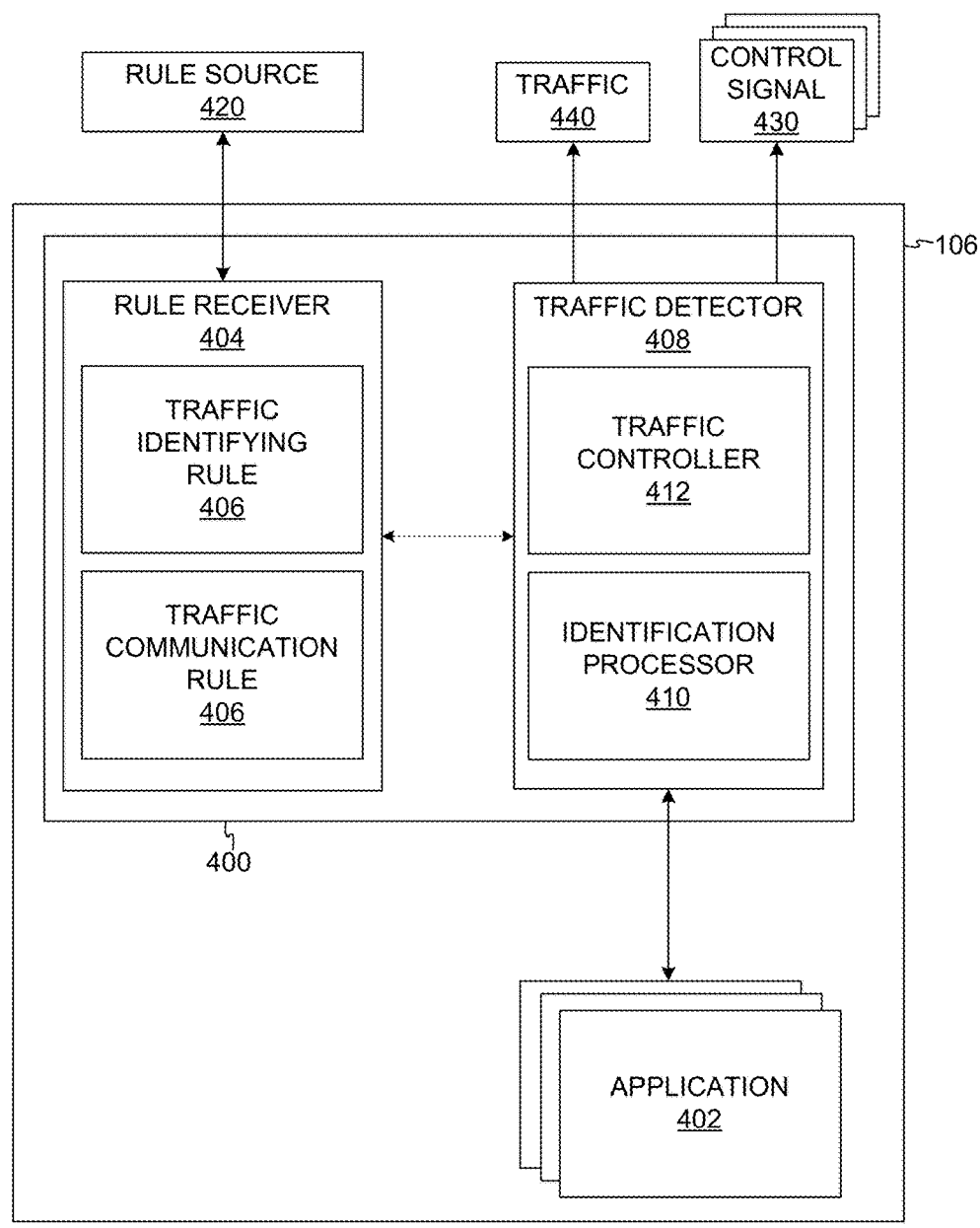
FIG. 4 shows a functional block diagram of another exemplary wireless communication system including traffic detection.

FIG. 4 shows a functional block diagram of another exemplary wireless communication system including traffic detection. The wireless communication device shown in FIG. 4 may be configured to perform reverse link (e.g., from the user equipment to an access point) traffic detection. It will be appreciated that the wireless communication system shown in FIG. 4 shows exemplary components that may be used for traffic detection. The wireless communication system shown in FIG. 4 may be implemented in whole or in part in a wireless communication device, such as that shown in FIG. 2.

The wireless communication system includes an application 402. As discussed above, the user equipment 106 may include an application 402. As shown, the user equipment 106 may include multiple applications. The application 402 may be configured to transmit data (e.g., packet data) through a traffic analyzer 400.

The traffic analyzer 400 includes a rule receiver 404. The rule receiver 404 is configured to receive traffic rules from a rule source 420. As discussed above, the rule source 420 may be the network the user equipment 106 is associated with. In some implementations, the rule source 420 may be included in the user equipment 106 such as a memory storage (e.g., SIM card). In some implementations, the rule source 420 may be coupled with the user equipment 106 such as a USB connection to a personal computer. Although only one rule source 420 is shown in FIG. 4, it will be understood that multiple rule sources may provide traffic rules to the user equipment 106.

The rule receiver 404 may directly receive rules from the rule source 420. In some implementations, the rule receiver 404 may obtain the rules from other components of the user equipment 106 via the bus 226. For example, the rules may be stored in the memory 206 or received over the air via the antenna 216 and the receiver 212.

The traffic rule may include a traffic identifying rule 406. The traffic identifying rule 406 indicates how to determine the application identifier associated with the provided rule. For example, the traffic identifying rule 406 may include a header field name which should be interrogated to identify the application identifier. The traffic identifying rule 406 may include computations such as a decoding filter to apply to a value included in the packet data. The traffic identifying rule 406 may also include compound identifiers. For example, the traffic identifying rule 406 may include the locations of two header fields which are concatenated and then hashed according to a provided hash function.

The traffic rule may also include a traffic communication rule 406. The traffic communication rule 406 may be associated with one or more traffic identifying rules. The traffic communication rule 406 includes communication characteristics that should be applied if the application identifier is detected by the associated traffic identifying rule 406. For example, the traffic communication rule 406 may identify a bearer that should be used for the traffic. As another example, the traffic communication rule 406 may exclude certain traffic types. As a further example, the traffic communication rule 406 may indicate a quality of service for the traffic. In still another example, the traffic communication rule 406 may indicate a quantity of traffic permitted (e.g., number of bits per time period).

In some implementations, the traffic rule may also include a prioritization. The prioritization may be used to determine the order of applying the rules in the instance where multiple rules are provided. The traffic rule may include conditions. For example, certain traffic rules may apply only when the user equipment 106 is operating at low power. This may extend the battery life of the user equipment 106 by avoiding power intensive communications during such operational periods. Another condition may be signal strength. Certain communications (e.g., video chat) may experience delays if attempted using a low signal strength. By applying a traffic rule which allows video chat applications when signal strength is above a threshold, consistent minimal performance for the video chat may be provided.

Having obtained at least one rule, a traffic detector 408 is configured to apply the obtained rules to traffic associated with the application 402. The application 402 may transmit data which the application 402 addresses to a network destination (e.g., not on the user equipment 106). The traffic detector 408 obtains this data. An identification processor 410 interrogates the data using the traffic identifying rule 406. In implementations where multiple traffic identifying rules may be included, the identification processor may be configured to apply a hierarchy of rules, apply the first matching rule, apply all rules from lowest priority to highest priority, apply all rules with reconciliation of conflicting rules based on priority, or other rule processing scheme.

Once the traffic has been identified, a traffic controller 412 may be configured to generate one or more control signals 430. The control signal 430 may be used to embody the traffic communication rule 406 (e.g., quality of service, bearer, accounting, authorization, etc.) for the traffic. The control signal 430 may be transmitted to an element of the user equipment 106 via the bus 226. In some implementations, the value indicated by the control signal 430 may be stored in the memory 206 and used for further processing by the user equipment 206.

For traffic which is going to be transmitted, a traffic packet 440 is also transmitted by the traffic detector 408. In some implementations, the traffic packet 440 is the same packet as received from the application 402. In some implementations, the application traffic is a modified by the traffic controller 412 (e.g., new header field added, authorization code included) to generate the traffic packet 440.

It may be desirable for the user equipment 160 to perform such traffic detection prior to transmitting the packet to the network. In some implementations, by applying a suppression rule at the user equipment 106, traffic from an unwanted application type may be prevented from being transmitted. By avoiding the initial transmission, the user equipment 106 saves resources (e.g., power, processing time, air time) by avoiding the transmission of and waiting for a failure message for the unwanted traffic. This can also reduce airtime congestion, power consumption, and processing at the network, such as at an access point. The processing avoided includes signal traffic processing. The processing avoided may also include subsequent deep packet inspection of the packet that may be configured by the network operator for traffic analysis at the network level, such as that described in FIG. 3.

Furthermore, by employing the user equipment 106 to perform traffic detection, quality of service and other communication parameters may be managed on the reverse link. This may provide enhanced utilization of the network resources as the reverse link messages can be managed at the time of transmission and, in some instances, for the first transmission.

Figure 5:
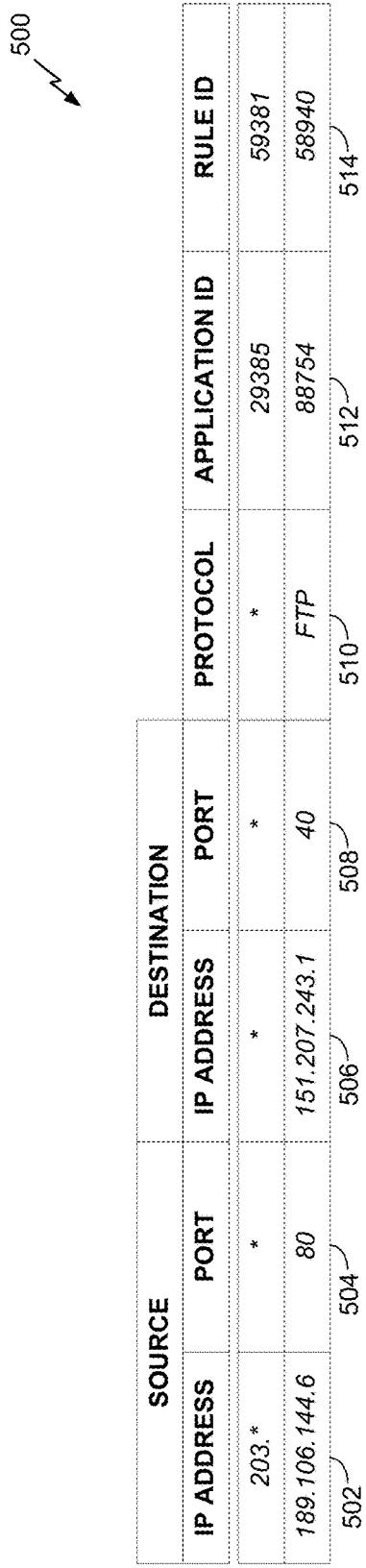
FIG. 5 shows a table including exemplary policy and charging rules.

FIG. 5 shows an exemplary table including policy and charging rules. In the implementation shown, the policy and charging rules may be stored in a table 500. The table 500 may include columns which define the matching criteria (e.g., 502, 504, 506, 508, 510, and 512) and columns which define policy and/or charging rules for network traffic matching the criteria (e.g., 514). The rule identifier 514 may be used to look up the traffic rule (e.g., as stored in memory) for the associated traffic. In some implementations, rather than rules by reference, the rule may be specified in mapping table. Accordingly, each row in the table 400 corresponds to a criteria-rule pairing. The matching criteria may be based on one or more of the network traffic source IP address 502, the network traffic destination IP address 406, the network traffic source port 504, the network traffic destination port 408, the network traffic protocol 510, and an application identifier 510 indicating the application associated with the network traffic. The matching criteria may be used to filter packets of network traffic.

As shown in FIG. 5, the criteria may employ one or more "wildcard" characters which may be used to perform partial matches for any criterion value. Similarly, additional logical syntax, such as regular expressions, Boolean operators, or ranges, may be used to specify a matching criteria column value. As shown in FIG. 5, the application identifier 510 is specified as a numeric value. It will be understood that this application identifier need not be limited to numbers and may, in some implementations, be a composite identifier based on additional factors. As shown in FIG. 5, a match will provide a look up of a policy and/or charging rule 514 based on a rule identifier. In some implementations, the policy and/or charging rule 514 may be directly specified in the table without departing from the scope or spirit of the disclosure.

The policy and charging rules may be used for accounting purposes on a user equipment basis (e.g., per individual subscribers). For example, an operator may apply different charging rules for different types of traffic from the same server such as charging one rate for Skype text chat versus Skype voice over IP calls. Even though the network traffic is directed to the same host IP using the HTTP protocol, by including an application identifier, more finely grained network control is made possible.

Another individual network control is quality of service parameters. At the application level, quality of service parameters may be specified for a given device. For example, a network provider may desire to limit the total bandwidth used per month of particular application data. In another example, a network provider may desire to limit the bitrate allowed for particular application data. These aspects are generally referred to as quality of service parameters. Quality of service parameters may also be applied based on aggregate application information. For example, the operator may define a maximum bit rate based on an average number of users for a given application. In some implementations, the quality of service parameter may specify a preferred link layer to use for a particular application.

Quality of service parameters may be managed for the uplink, the downlink, or both the uplink and the downlink. Where the quality of service parameters are used for the uplink only, the PCRF may install the rules statically or dynamically in the BBERF. In a static installation implementation, the rules may be installed at the time the device connects to the packet data network. In some implementations, the PCRF may install the rules dynamically. In a dynamic installation implementation, the TDF may be configured to signal the PCRF when an application is detected that does not have rules installed. The PCRF obtains the rules from an application function and passes the rules to the BBERF. Once the rules are installed at the BBERF, the BBERF may be configured to set up different service connections with different radio access networks with varying priorities.

In implementations where the rules are used for controlling uplink and downlink communications, the application identifier to application mapping may be transmitted to the user equipment 106. For example, the rules may be pre-installed on the user equipment 106, an over-the-air or SIM card based provisioning scheme (e.g., Open Mobile Alliance based provisioning), or via access network discovery and selection. In some implementations, the network may initiate the update of the rules whereby in addition to setting up service connections, the BBREF may also install the rule in the user equipment 106. In some implementations, the user equipment 106 may initiate the update of the rules whereby the user equipment 106 establishes a packet filter when the application is generated.

Because network traffic may be identified at an application level, the traffic detection processor may also use policy and charging rules to perform application specific network load balancing. At an individual user equipment 106 level, based on application detection, the policy and charging rules may identify a preferred radio access technology to the bearer binding and event reporting processor 335. For example, certain application traffic may be better suited to E-UTRA communication rather than accessed via eHRPD.

At a network level, inter-radio access technology idle-handoff selection criteria advertised by the radio network may be based on statistics obtained from the traffic detection processor 305. For example, if a large number of user equipment 106 devices are accessing YouTube, the idle-handoff parameters may be adjusted to bias traffic toward E-UTRA radio access rather than, say, evolved high rate data packet (eHRDP) radio access. As another example, if a large number of user equipment 106 devices are using background applications such as Facebook, the idle-handoff parameters may be adjusted to bias traffic toward eHRDP radio access rather than, say, E-UTRA radio access.

In some implementations, the bearer binding and event reporting processor 335 may be configured to filter the preferred radio access technology for identified applications. The filtering may occur for all active data flows of user equipment 106 connected to the bearer binding and event reporting processor 335. The bearer binding and event reporting processor 335 may apply a local policy to determine the preferred radio access technology for a given user equipment 106 data flow. This preference may be transmitted to the radio access network. For active handoff, that is handoff for individual user equipment 106, the radio access network may directly use this indication to direct the user equipment 106 to the preferred radio access technology. For idle handoff, the radio access network may further filter the preferred radio access technology of all user equipment 106 in a basic service area for the radio access network. In some implementations, the radio access network may use the aggregate preference to determine handoff parameters for the radio access network and thus all user equipment 106 in the basic service area.

Figure 6:
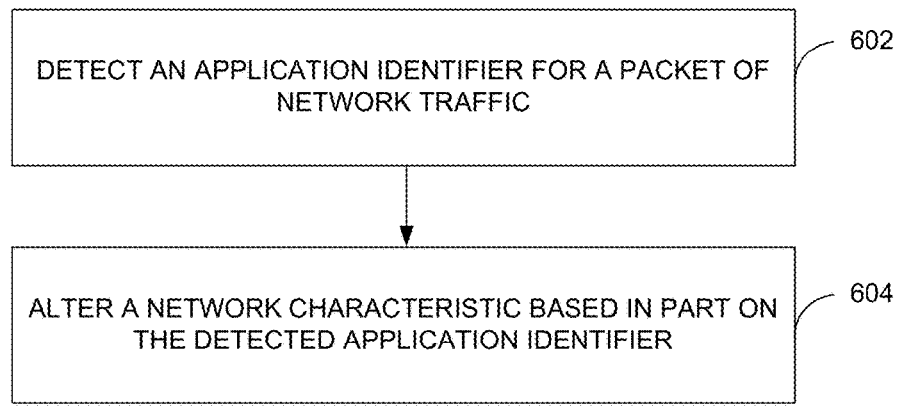
FIG. 6 shows a flow diagram of an exemplary method of controlling network traffic.

FIG. 6 shows an exemplary flow diagram for a method of controlling network traffic. The method of FIG. 6 may be implemented in whole or in part using the devices described herein, such as that shown in FIG. 2, FIG. 3, and FIG. 4. At block 602, an application identifier is detected for a packet of network traffic. In some implementations, the application identifier may be included in a packet header field. In some implementations, the application identifier may be detected based on a previously established connection. For example, an application may identify itself when submitting a packet for transmission by the user equipment and/or initiating a connection with the network. A session may be established for the application. A session identifier may be used for communications for this application. Accordingly, the session identifier may be sufficient to identify the application generating the network traffic for the session.

At block 604, a network characteristic may be altered based in part on the detected application identifier. As described above, network characteristics redirecting network traffic for a specific user equipment-application combination may be altered. In some implementations, a network characteristic identifying an idle-handoff parameter for user equipment accessing a radio access network may be altered. In some implementations, a network accounting characteristic may be altered such as a price per byte transferred. In some implementations, quality of service parameters may be altered on a per-application and/or per-user equipment basis.

Figure 7:
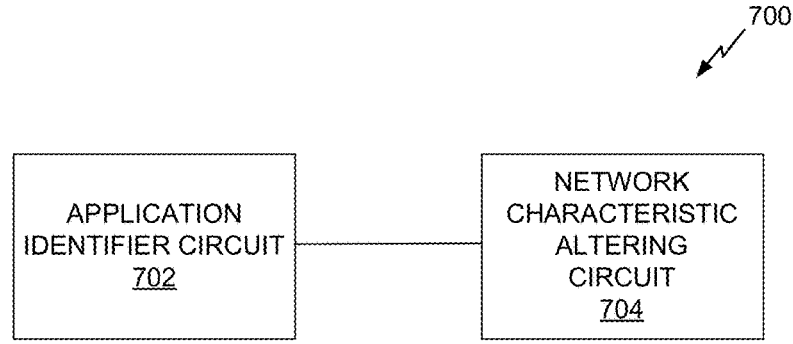
FIG. 7 shows a functional block diagram of another exemplary wireless device.

FIG. 7 shows an exemplary functional block diagram of a network traffic control device. Those skilled in the art will appreciate that a network traffic control device may have more components than the simplified network traffic control device 700 illustrated in FIG. 7. The network traffic control device 700 shown in FIG. 7 includes only those components useful for describing some prominent features of implementations with the scope of the claims. The network traffic control device 700 includes an application identifier circuit 702 and a network characteristic altering circuit 704. In one implementation, the application identifier circuit 702 may be configured to detecting to an application identifier for a packet of network traffic. In some implementations, the means for detecting includes an application identifier circuit 702. In one implementation, the network characteristic altering circuit 704 may be configured to alter a network characteristic based in part on the detected application identifier. For example, the network characteristic altering circuit 704 may be configured to alter a network characteristic in one or more of the ways described above in reference to FIG. 5. In some implementations, the means for altering includes a network characteristic altering circuit 704.

Figure 8:
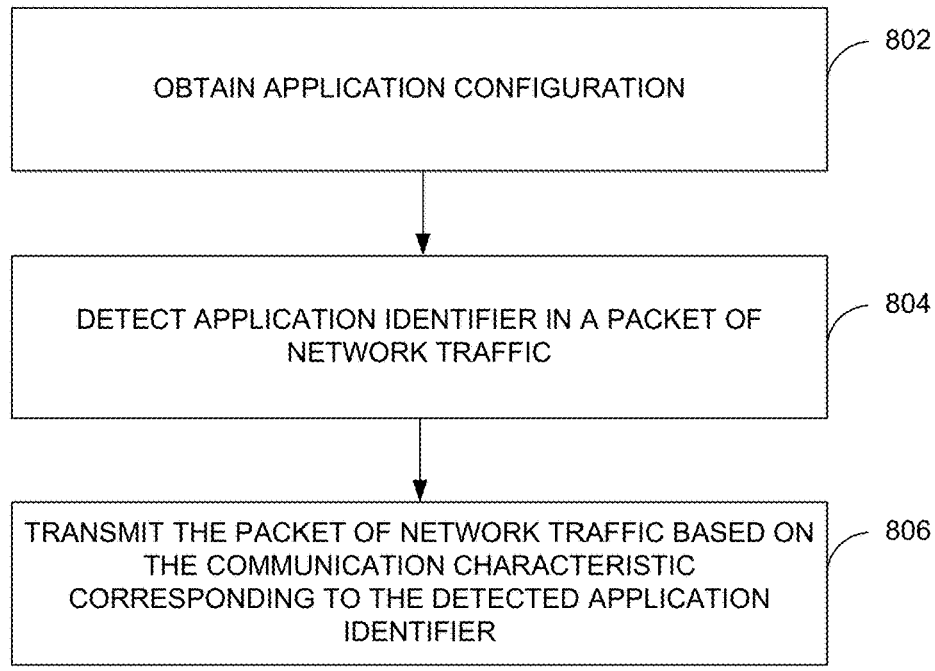
FIG. 8 shows a flow diagram for another exemplary method of controlling application traffic.

FIG. 8 shows a flow diagram for another exemplary method of controlling application traffic. The method shown in FIG. 8 may be implemented in whole or in part in user equipment such as the wireless communication device shown in FIG. 2 or FIG. 4. The method begins at block 802 where obtaining, at an electronic device, an application configuration, the application configuration including an application identifier identifying an application of a plurality of applications and a network communication characteristic corresponding to each of the plurality of applications is obtained at an electronic device. Each of the plurality of applications are configured to access a common network destination using a common network protocol from a device. At block 804, the application identifier in a packet of network traffic is detected, at the electronic device. At block 806, the packet of network traffic based on the network communication characteristic corresponding to the detected application identifier is transmitted from the electronic device.

Figure 9:
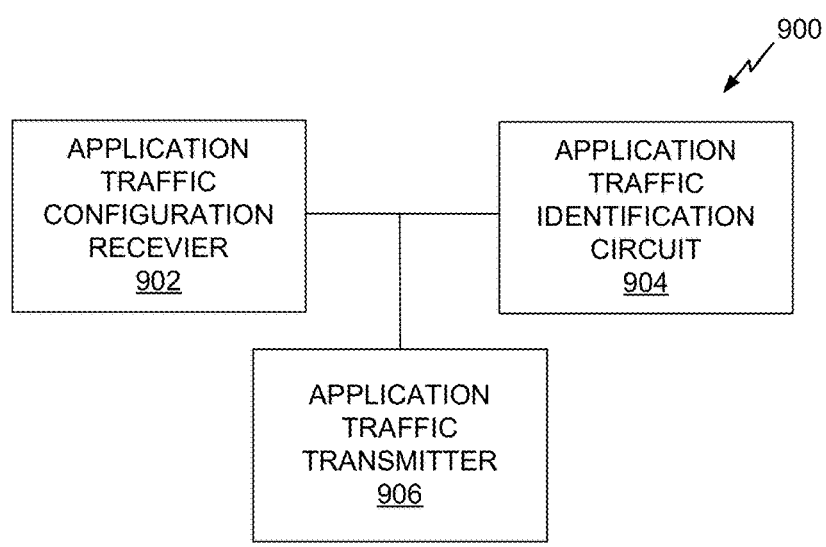
FIG. 9 shows a functional block diagram of another exemplary wireless device.

FIG. 9 shows a functional block diagram of another exemplary wireless device for controlling network traffic. Those skilled in the art will appreciate that a network traffic control device may have more components than the simplified network traffic control device 900 illustrated in FIG. 9. The network traffic control device 900 shown in FIG. 9 includes only those components useful for describing some prominent features of implementations with the scope of the claims. The network traffic control device 900 includes an application traffic configuration receiver 902, an application traffic identification circuit 904, and an application traffic transmitter 906.

The application traffic configuration receiver 902 is configured to obtain an application configuration, the application configuration including an application identifier identifying an application of a plurality of applications and a network communication characteristic corresponding to each of the plurality of applications, each of the plurality of applications configured to access a common network destination using a common network protocol from a device. The application traffic configuration receiver 902 may include one or more of an antenna, a network interface, a memory, a processor and a signal processor. In some implementations, the means for obtaining, at the device, an application configuration includes the application traffic configuration receiver 902.

The application traffic identification circuit 904 is configured to detect, at the device, the application identifier in a packet of network traffic. The application traffic identification circuit 904 may include one or more of a memory, a processor, a comparator, an arithmetic unit, and a packet parser. In some implementations, the means for detecting the application identifier in a packet of network traffic includes the application traffic identification circuit 904.

The application traffic transmitter 906 is configured to transmit the packet of network traffic based on the network communication characteristic corresponding to the detected application identifier. The application traffic transmitter 906 may include one or more of a memory, a processor, an antenna, a signal generator, a counter, a comparator, and network interface. In some implementations, the means for transmitting the packet of network traffic includes the application traffic transmitter 906.

Figure 10:
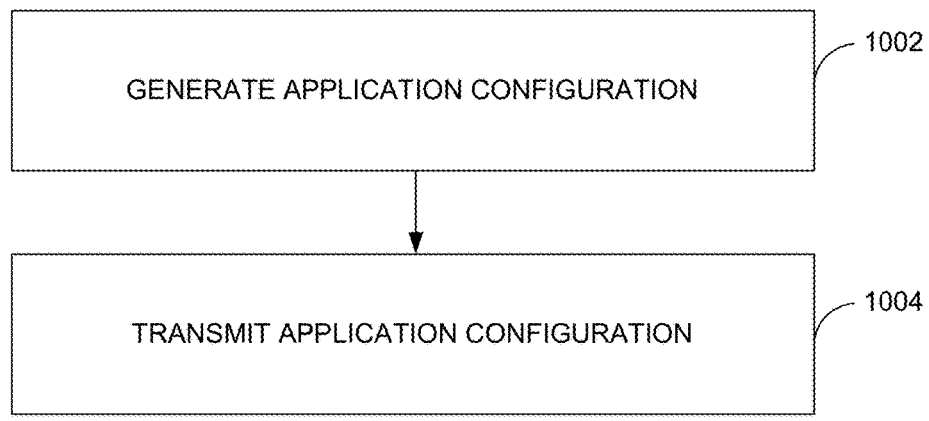
FIG. 10 shows a flow diagram for another exemplary method of controlling application traffic.

FIG. 10 shows a flow diagram for another exemplary method of controlling application traffic. The method shown in FIG. 10 may be implemented in whole or in part in an access point such as the wireless communication device shown in FIG. 2 or FIG. 3. The method begins at block 1002 where an application configuration, the application configuration including an application identifier identifying an application of a plurality of applications and a network communication characteristic corresponding to each of the plurality of applications is generated. Each of the plurality of applications are configured to access a common network destination using a common network protocol from a device. The generation may be for a specific device. The generation may be for an aggregation of devices. When configurations are generated for an aggregation of devices, the generation may include statistical analysis of application traffic and identification of alternative communication characteristics for the application traffic. For example, if a network determines that, based on the average packet size and connection length for a given application type, a high rate packet data (HRPD) network would provide a better experience than an alternative network technology, an application rule identifying the HRPD for the application type may be generated. At block 1004, the application configuration is transmitted from the network entity to an electronic device.

Figure 11:
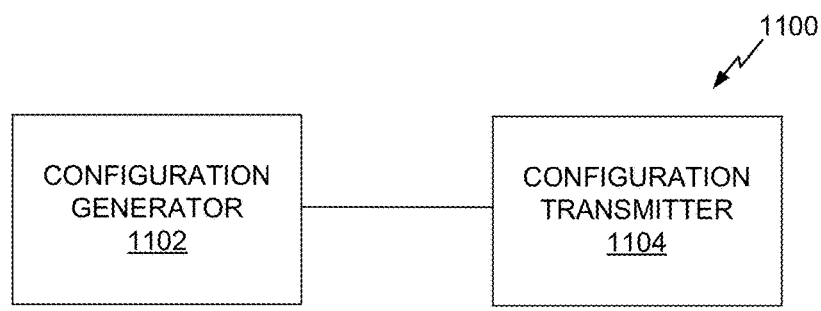
FIG. 11 shows a functional block diagram of another exemplary wireless device.

FIG. 11 shows a functional block diagram of another exemplary wireless device. Those skilled in the art will appreciate that a network traffic control device may have more components than the simplified network traffic control device 1100 illustrated in FIG. 11. The network traffic control device 1100 shown in FIG. 11 includes only those components useful for describing some prominent features of implementations with the scope of the claims. The network traffic control device 1100 includes a configuration generator 1102 and a configuration transmitter 1104.

The configuration generator 1102 is configured to generate an application configuration, the application configuration including an application identifier identifying an application of a plurality of applications and a network communication characteristic corresponding to each of the plurality of applications. The configuration generator 1102 may include one or more of a packet inspector, a signal processor, a receiver, a memory, a processor, a comparator, and a signal generator. In some implementations, the means for generating an application configuration includes the configuration generator 1102.

The configuration transmitter 1104 is configured to transmit the application configuration to an electronic device. The configuration transmitter may include a transmitter, a signal generator, a power source, an amplifier, an antenna, and a network interface. In some implementations, the means for transmitting the application configuration includes the configuration transmitter 1104.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of controlling network traffic comprising:
    obtaining, at an electronic device, an application configuration, the application configuration including an application identifier identifying an application of a plurality of applications and a network communication characteristic corresponding to each of the plurality of applications, each of the plurality of applications configured to access a common network destination using a common network protocol wherein the network communication characteristic comprises an idle mode handoff parameter;
    detecting, at the electronic device, the application identifier in a packet of network traffic from the application;
    determining the idle mode handoff parameter for the packet of network traffic from the obtained application configuration based on the detected application identifier to bias toward a network of a first radio access type; and
    transmitting, from the electronic device, the packet of network traffic based on the network communication characteristic comprising the idle mode handoff parameter and corresponding to the detected application identifier.

2. The method of claim 1, wherein the electronic device comprises a user equipment.

3. The method of claim 1, wherein the network protocol comprises one of hypertext transport protocol, remote transport protocol, secure remote transport protocol, constrained application protocol, session initiation protocol, or file transport protocol.

4. The method of claim 1, wherein applying the network communication characteristic comprises altering an uplink network traffic characteristic.

5. The method of claim 1, wherein the network communication characteristic includes a target network for the application, and
    wherein transmitting the packet includes redirecting the transmission of the packet from a first network to the target network based in part on the target network included in the application configuration for the detected application identifier.

6. The method of claim 1, wherein the network communication characteristic includes a target radio bearer for the application, and
    wherein transmitting the packet includes redirecting the transmission of the detected packet from a first radio bearer to the target radio bearer based in part on a radio bearer included in the application configuration for the detected application identifier.

7. The method of claim 1, wherein obtaining the application configuration comprises receiving the application configuration from a network entity.

8. The method of claim 7, wherein the network entity comprises an access point.

9. The method of claim 7, wherein receiving the application configuration from the network entity includes receiving a broadcast signal including the application configuration.

10. The method of claim 7, wherein receiving the application configuration from the network entity includes receiving a unicast signal including the application configuration.

11. The method of claim 7, wherein receiving the application configuration from the network entity includes receiving a multi-cast signal including the application configuration.

12. The method of claim 1, wherein transmitting the packet includes altering a network accounting characteristic for the transmission.

13. The method of claim 12, wherein altering the network accounting characteristic comprises altering a counter included in the electronic device.

14. The method of claim 1, wherein transmitting the packet includes altering a quality of service parameter for the transmission.

15. The method of claim 14, wherein the quality of service parameter is altered for subsequent transmission from the device.

16. The method of claim 1, wherein the application configuration includes a traffic identification rule and a traffic communication rule,
wherein detecting the application identifier is based on the traffic identification rule, and wherein transmitting is based on the traffic communication rule.

17. The method of claim 16, wherein the traffic identification rule comprises at least one of a header field, an octet, and a function applied thereto of the packet of network traffic determining the application identifier for the application configuration.

18. The method of claim 16, wherein the traffic communication rule comprises an traffic source IP address, a traffic source port, a traffic destination IP address, a traffic destination port, a traffic protocol, an application identifier, and a rule identifier indicating the network communication characteristic for the identified application.

19. A device for controlling network traffic comprising:
an application;
a rules receiver configured to obtain, at the device, an application configuration, the application configuration including an application identifier identifying the application from a plurality of applications and a network communication characteristic corresponding to each of the plurality of applications, each of the plurality of applications configured to access a common network destination using a common network protocol, wherein the network communication characteristic comprises an idle mode handoff parameter;
a traffic detector configured to detect, at the device, the application identifier in a packet of network traffic;
a network communication characteristic component configured to determine the idle mode handoff parameter for the packet of network traffic from the obtained application configuration based on the detected application identifier to bias toward a network of a first radio access type; and
a transmitter configured to transmit, from the device, the packet of network traffic based on the network communication characteristic comprising the idle mode handoff parameter and corresponding to the detected application identifier.

20. The device of claim 19, wherein the device comprises a user equipment.

21. The device of claim 19, wherein the network protocol comprises one of hypertext transport protocol, remote transport protocol, secure remote transport protocol, constrained application protocol, session initiation protocol, or file transport protocol.

22. The device of claim 19, wherein applying the network communication characteristic comprises altering an uplink network traffic characteristic.

23. The device of claim 19, wherein the network communication characteristic includes a target network for the application, and
wherein transmitting the packet includes redirecting the transmission of the packet from a first network to the target network based in part on the target network included in the application configuration for the detected application identifier.

24. The device of claim 19, wherein the network communication characteristic includes a target radio bearer for the application, and
wherein transmitting the packet includes redirecting the transmission of the detected packet from a first radio bearer to the target radio bearer based in part on a radio bearer included in the application configuration for the detected application identifier.

25. The device of claim 19, wherein obtaining the application configuration comprises receiving the application configuration from an network entity.

26. The device of claim 25, wherein the network entity comprises an access point.

27. The device of claim 25, wherein receiving the application configuration from the network entity includes receiving a broadcast signal including the application configuration.

28. The device of claim 25, wherein receiving the application configuration from the network entity includes receiving a unicast signal including the application configuration.

29. The device of claim 25, wherein receiving the application configuration from the network entity includes receiving a multi-cast signal including the application configuration.

30. The device of claim 19, wherein transmitting the packet includes altering a network accounting characteristic for the transmission.

31. The device of claim 30, wherein altering the network accounting characteristic comprises altering a counter included in the device.

32. The device of claim 19, wherein transmitting the packet includes altering a quality of service parameter for the transmission.

33. The device of claim 32, wherein the quality of service parameter is altered for subsequent transmission from the device.

34. The device of claim 19, wherein the application configuration includes a traffic identification rule and a traffic communication rule,
wherein detecting the application identifier is based on the traffic identification rule, and
wherein transmitting is based on the traffic communication rule.

35. The device of claim 34, wherein the traffic identification rule comprises at least one of a header field, an octet, and a function applied thereto of the packet of network traffic determining the application identifier for the application configuration.

36. The device of claim 34, wherein the traffic communication rule comprises an traffic source IP address, a traffic source port, a traffic destination IP address, a traffic destination port, a traffic protocol, an application identifier, and a rule identifier indicating the network communication characteristic for the identified application.

37. A device for controlling network traffic comprising:
means for obtaining, at the device, an application configuration, the application configuration including an application identifier identifying an application of a plurality of applications and a network communication characteristic corresponding to each of the plurality of applications, each of the plurality of applications configured to access a common network destination using a common network protocol, wherein the network communication characteristic comprises an idle mode handoff parameter;
means for detecting, at the device, the application identifier in a packet of network traffic;

means for determining the idle mode handoff parameter for the packet of network traffic from the obtained application configuration based on the detected application identifier to bias toward a network of a first radio access type; and means for transmitting, from the device, the packet of network traffic based on the network communication characteristic comprising the idle mode handoff parameter and corresponding to the detected application identifier.

38. A non-transitory computer-readable storage medium comprising instructions executable by a processor of an apparatus, the instructions causing the apparatus to:

obtain, at the apparatus, an application configuration, the application configuration including an application identifier identifying an application included in the apparatus of a plurality of applications and a network communication characteristic corresponding to each of the plurality of applications, each of the plurality of applications configured to access a common network destination using a common network protocol, wherein the network communication characteristic comprises an idle mode handoff parameter;

detect, at the apparatus, the application identifier in a packet of network traffic;

determine the idle mode handoff parameter for the packet of network traffic from the obtained application configuration based on the detected application identifier to bias toward a network of a first radio access type; and transmit, from the apparatus, the packet of network traffic based at least on the network communication characteristic comprising the idle mode handoff parameter and corresponding to the detected application identifier.

39. A method of controlling network traffic comprising:

generating, at a network entity, an application configuration, the application configuration including an application identifier identifying an application of a plurality of applications and a network communication characteristic corresponding to each of the plurality of applications, each of the plurality of applications configured to access a common network destination using a common network protocol, wherein the network communication characteristic comprises an idle mode handoff parameter; and transmitting, from the network entity to an electronic device including the application, the application configuration, the application configuration being based on the network communication characteristic comprising the idle mode handoff parameter and corresponding to the application identifier, wherein the application configuration enables the idle mode handoff parameter for a packet of network traffic to be determined based on the application identifier to bias toward a network of a first radio access type.

40. The method of claim 39, wherein the electronic device comprises a user equipment.

41. The method of claim 39, wherein the network protocol comprises one of hypertext transport protocol, remote transport protocol, secure remote transport protocol, constrained application protocol, session initiation protocol, or file transport protocol.

42. The method of claim 39, wherein applying the network communication characteristic comprises an uplink network traffic characteristic.

43. The method of claim 39, wherein the network communication characteristic includes a target network for the application.

44. The method of claim 39, wherein the network communication characteristic includes a target radio bearer for the application.

45. The method of claim 39, wherein the network entity comprises an access point.

46. The method of claim 39, wherein transmitting the application configuration includes transmitting a broadcast signal including the application configuration.

47. The method of claim 39, wherein transmitting the application configuration includes transmitting a unicast signal including the application configuration.

48. The method of claim 39, wherein transmitting the application configuration includes transmitting a multi-cast signal including the application configuration.

49. The method of claim 39, wherein the application configuration includes a network accounting characteristic for transmissions from the application.

50. The method of claim 39, wherein the application configuration includes a quality of service parameter for transmissions from the application.

51. The method of claim 39, wherein the application configuration includes a traffic identification rule and a traffic communication rule.

52. The method of claim 51, wherein the traffic identification rule comprises at least one of a header field, an octet, and a function applied thereto of the packet of network traffic determining the application identifier for the application configuration.

53. The method of claim 51, wherein the traffic communication rule comprises an traffic source IP address, a traffic source port, a traffic destination IP address, a traffic destination port, a traffic protocol, an application identifier, and a rule identifier indicating the network communication characteristic for the identified application.

54. The method of claim 39, wherein generating the application configuration comprises:

detecting packets of traffic for the application from a plurality of electronic devices; and identifying a network communication characteristic for the application based on the detected packets of traffic.

55. The method of claim 54, wherein identifying the network communication characteristic comprises:

determining an average packet size for packets of traffic transmitted via a first network resource;

identifying a second network resource configured to transmit the packets of traffic; and including the second network resource in the network communication characteristic.

56. A device for controlling network traffic comprising:

a configuration generator configured to generate an application configuration, the application configuration including an application identifier identifying an application of a plurality of applications and a network communication characteristic corresponding to each of the plurality of applications, each of the plurality of applications configured to access a common network destination using a common network protocol, wherein the network communication characteristic comprises an idle mode handoff parameter; and a transmitter configured to transmit, to an electronic device including the application, the application configuration, the application configuration being based at least on the network communication characteristic comprising the idle mode handoff parameter and corresponding to the application identifier, wherein the application configuration enables the idle mode handoff parameter for a packet of network traffic to be determined based on the application identifier to bias toward a network of a first radio access type.

57. The device of claim 56, wherein the electronic device comprises a user equipment.

58. The device of claim 56, wherein the network protocol comprises one of hypertext transport protocol, remote transport protocol, secure remote transport protocol, constrained application protocol, session initiation protocol, or file transport protocol.

59. The device of claim 56, wherein applying the network communication characteristic comprises an uplink network traffic characteristic.

60. The device of claim 56, wherein the network communication characteristic includes a target network for the application.

61. The device of claim 56, wherein the network communication characteristic includes a target radio bearer for the application.

62. The device of claim 56, wherein the device for controlling network traffic comprises an access point.

63. The device of claim 56, wherein the transmitter is configured to transmit the application configuration via a broadcast signal including the application configuration.

64. The device of claim 56, wherein the transmitter is configured to transmit the application configuration via a unicast signal including the application configuration.

65. The device of claim 56, wherein the transmitter is configured to transmit the application configuration via a multi-cast signal including the application configuration.

66. The device of claim 56, wherein the application configuration includes a network accounting characteristic for transmissions from the application.

67. The device of claim 56, wherein the application configuration includes a quality of service parameter for transmissions from the application.

68. The device of claim 56, wherein the application configuration includes a traffic identification rule and a traffic communication rule.

69. The device of claim 68, wherein the traffic identification rule comprises at least one of a header field, an octet, and a function applied thereto of a packet of network traffic determining the application identifier for the application configuration.

70. The device of claim 68, wherein the traffic communication rule comprises an traffic source IP address, a traffic source port, a traffic destination IP address, a traffic destination port, a traffic protocol, an application identifier, and a rule identifier indicating the network communication characteristic for the identified application.

71. The device of claim 56, wherein generating the application configuration comprises:
detecting packets of traffic for the application from a plurality of electronic devices; and
identifying a network communication characteristic for the application based on the detected packets of traffic.

72. The device of claim 71, wherein identifying the network communication characteristic comprises:
determining an average packet size for packets of traffic transmitted via a first network resource;
identifying a second network resource configured to transmit the packets of traffic; and
including the second network resource in the network communication characteristic.

73. A device for controlling network traffic comprising:
means for generating, at an network entity, an application configuration, the application configuration including an application identifier identifying an application of a plurality of applications and a network communication characteristic corresponding to each of the plurality of applications, each of the plurality of applications configured to access a common network destination using a common network protocol, wherein the network communication characteristic comprises an idle mode handoff parameter; and
means for transmitting, from the network entity to an electronic device including the application, the application configuration, the application configuration being based on the network communication characteristic comprising the idle mode handoff parameter and corresponding to the application identifier, wherein the application configuration enables the idle mode handoff parameter for a packet of network traffic to be determined based on the application identifier to bias toward a network of a first radio access type.

74. A non-transitory computer-readable storage medium comprising instructions executable by a processor of an apparatus, the instructions causing the apparatus to:
generate an application configuration, the application configuration including an application identifier identifying an application of a plurality of applications and a network communication characteristic corresponding to each of the plurality of applications, each of the plurality of applications configured to access a common network destination using a common network protocol, wherein the network communication characteristic comprises an idle mode handoff parameter; and
transmit, to an electronic device including the application, the application configuration, the application configuration being based on the network communication characteristic comprising the idle mode handoff parameter and corresponding to the application identifier, wherein the application configuration enables the idle mode handoff parameter for a packet of network traffic to be determined based on the application identifier to bias toward a network of a first radio access type.

75. The method of claim 1, wherein the application identifier comprises a unique identifier.

76. The method of claim 1, wherein the application identifier is based on a header field name.

77. The method of claim 1, wherein the application identifier comprises a compound identifier based on at least two header fields.

78. The method of claim 1, wherein the application identifier comprises a numeric value.

* * * * *